(12) United States Patent
Shafiei et al.

(10) Patent No.: US 10,928,329 B2
(45) Date of Patent: Feb. 23, 2021

(54) METHOD AND SYSTEM FOR OPTICALLY DETECTING AND CHARACTERIZING DEFECTS IN SEMICONDUCTORS

(71) Applicant: Board of Regents, The University of Texas System, Austin, TX (US)

(72) Inventors: Farbod Shafiei, Austin, TX (US); Michael W. Downer, Austin, TX (US)

(73) Assignee: Board of Regents, The University of Texas System, Austin, TX (US)

(*) Notice: Subject to any disclaimer, the term of this patent is extended or adjusted under 35 U.S.C. 154(b) by 219 days.

(21) Appl. No.: 16/157,765

(22) Filed: Oct. 11, 2018

(65) Prior Publication Data

US 2019/0107495 A1   Apr. 11, 2019

Related U.S. Application Data

(60) Provisional application No. 62/570,962, filed on Oct. 11, 2017.

(51) Int. Cl.
  *G01N 21/88*   (2006.01)
  *G01N 21/95*   (2006.01)
  *G01N 21/84*   (2006.01)

(52) U.S. Cl.
  CPC ..... *G01N 21/8806* (2013.01); *G01N 21/8422* (2013.01); *G01N 21/8851* (2013.01); *G01N 21/9501* (2013.01); *G01N 21/9505* (2013.01); *G01N 2021/8864* (2013.01); *G01N 2201/0846* (2013.01); *G01N 2201/10* (2013.01)

(58) Field of Classification Search
  CPC ........................... G01N 21/88; G01N 21/9505
  See application file for complete search history.

(56) References Cited

U.S. PATENT DOCUMENTS

| 5,894,349 | A | 4/1999 | Harris et al. |
| 6,459,493 | B1* | 10/2002 | Sugiura ................. G01B 11/06 356/630 |
| 2010/0072485 | A1* | 3/2010 | Suda ................. H01L 21/02529 257/77 |
| 2014/0110606 | A1 | 4/2014 | Furukawa et al. |
| 2017/0205377 | A1 | 7/2017 | Garnett et al. |

OTHER PUBLICATIONS

Igor I. Smolyaninov, "Near-field second harmonic generation from a rough metal surface", Jun. 5, 1997 (Year: 1997).*

(Continued)

*Primary Examiner* — Maurice C Smith
(74) *Attorney, Agent, or Firm* — Meunier Carlin & Curfman LLC

(57) ABSTRACT

Disclosed herein are optical near-field systems and methods that provide a noninvasive and fast approach to detect and characterize dislocation defects in semiconductors films caused by a mismatched film-substrate, such as found in GaAs—Si. The embodiments disclosed utilize optical cavities formed by the dislocation defects. The optical cavities act to localize a beam excitation light, which elicits second harmonic generated (SHG) light from the same region. The SHG light can be probed and mapped to provide information regarding the defects. The information derived from the map includes defect location, defect density, and defect orientation.

34 Claims, 7 Drawing Sheets

(56) References Cited

OTHER PUBLICATIONS

G. Lupke, "Characterization of semiconductor interfaces by second-harmonic generation", 1999, Elsevier (Year: 1999).*
Yici Guo, "Second-harmonic tomography of tissues" Sep. 1, 1997, Optics Letters (Year: 1997).*
Guohong Zou, "Cadmium-rare earth oxyborates $Cd_4ReO(BO_3)_3$ (Re=Y, Gd, Lu): congruently melting compounds with large SHG responses" (Year: 2012).*
Mascheck, M. et al. "Observing the localization of light in space and time by ultrafast second-harmonic microscopy", nature photonics, vol. 6, May 2012, pp. 293-298.
International Search Report and Written Opinion dated Dec. 14, 2018, from International Application No. PCT/US2018/055350, 7 pages.

* cited by examiner

METHOD AND SYSTEM FOR OPTICALLY DETECTING AND CHARACTERIZING DEFECTS IN SEMICONDUCTORS

CROSS-REFERENCE TO RELATED APPLICATION

This application claims priority to and benefit of U.S. provisional patent application Ser. No. 62/570,962 filed Oct. 11, 2017, which is fully incorporated by reference and made a part hereof.

FIELD OF THE INVENTION

The present disclosure relates to material testing and more specifically, to a technique for detecting and mapping defects in a semiconductor.

BACKGROUND

Improving the performance and shrinking the size of carrier channels, integrated circuits and semiconductor transistors, typically results in power dissipation because of electron carrier leakage. As a result, III-V semiconductors are desirable for this purpose because they have high velocity carriers and require low operating voltages. In practice, group III-V semiconductors (e.g., GaAs or InP) are typically integrated with a silicon (Si) or a Germanium (Ge) substrate. Problems with this integration may result because of a lattice mismatch (i.e., mismatch) at an interface between the III-V material and the substrate.

The mismatch can cause physical defects in the III-V material resulting from the strain of the mismatch. One particular defect is known as a dislocation (e.g., threading dislocation). Threading dislocations are irregularities in a crystallographic structure. These defects negatively affect the performance of the III-V semiconductor because they act as a sink and/or scattering point for charge carriers (e.g., electrons) and photons. Accordingly, it is desirable to detect these defects as part of semiconductor fabrication process.

Currently, all techniques for detecting dislocation defects are inconvenient, invasive, unreliable, and/or time consuming. For example, scanning transmission electron microscopy (STEM) or chemical etch-pit density (EPD) may be used to detect dislocation defects but neither of these techniques can be easily integrated into a conventional semiconductor fabrication line because they require a time-consuming invasive sample preparation. There is a non-invasive approach that uses x-ray diffraction (i.e., HRXRD), but this technique does not meet the reliability requirements necessary for device fabrication because of its inability to localize the defects.

A need, therefore, exists for a convenient, non-invasive technique for detecting and characterizing defects in semiconductor films on substrates that is fast and reliable enough to easily integrate with a typical semiconductor fabrication process.

SUMMARY

Accordingly, a defect detection and characterization (i.e., mapping) technique is disclosed. The defect mapping technique is based on the nonlinear optical properties of III-V semiconductor materials. When illuminated by pulsed laser light, a III-V semiconductor film can generate light in a non-linear regime (i.e., nonlinear light). Because defects (e.g., threading dislocation defects) can act as scattering points for the pulsed laser light, the pulsed laser light may be scattered and localized within regions that are semi-enclosed by the defects. The scattered and localized light in these regions may constructively interfere to create bright areas (i.e., hot-spots) of non-linear light. These localized hot-spots of non-linear light may be mapped at the surface of the film by collecting light in various regions at the surface of the film and filtering the collected light to retain only the nonlinear light. In other words, optical mapping the nonlinear response in regions at the surface of the III-V semiconductor can provide information about the defects within the III-V semiconductor.

Because of their size, ultra-high resolution mapping is necessary for understanding the defects. Collecting second harmonic generated (SHG) light in a far-field above the III-V semiconductor (e.g., a few times the excitation wavelength, typically greater than a few microns (µm)) or using a large collection aperture (e.g., greater than a few 100 nanometers (nm)) does not provide suitable resolution for mapping the defects. To achieve ultra-high resolution, the present disclosure embraces a near-field collection technique, wherein the light is typically collected at a distance of less than 100 nm (e.g., 20 nm) using an aperture of less than 100 nm (e.g., 50 nm).

The light used to illuminate the III-V semiconductor may penetrate a semiconductor film and experience scattering and/or reflection before being collected at the surface. The light collected from the surface is typically dominated by reflected photons and other linearly scattered or reflected photons (i.e., because the surface acts like a mirror). While this collection may provide information about the surface profile of the III-V semiconductor, information regarding the subsurface defects is masked by the linear response. To eliminate photons from the linear response, the present disclosure also embraces filtering the collected light to retain only the photons resulting from the non-linear response of the III-V semiconductor to the illumination.

This filtering approach is based on the discovery that the subsurface defects can localize the light through multiple reflections and scattering. In other words, the defects can form a reflective cavity for the light, and light localized in a defect region may support constructive interference of scattered light more than a region without defects. The resulting localized hot-spots can be mapped in a nonlinear regime by collecting/filtering light close to the surface of the film where the nonlinear light can easily escape the surface of the film. Thus, the approach of filtering to capture only the SHG light embraced by the present disclosure is extremely sensitive to detecting defects because it eliminates the noise created by linear excitation light.

Regions of the III-V semiconductor may be sequentially probed to create an intensity map of SHG light at the surface of the III-V semiconductor. The intensity map corresponds to the defects within the III-V semiconductor. Defect regions in III-V semiconductor will appear as hot-spots on the intensity map. Besides location, these hot-spots can provide additional information regarding the defects. For example, the size of a hot-spot may be used to determine defect density, while the shape/pattern of hot-spots may be used to determine defect orientation.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

FIGS. 7A and 7B graphically illustrate the relationship between hot-spot shape/pattern and defect orientation according to an embodiment of the present disclosure, wherein FIG. 7a is an exemplary intensity map (with line profiles and a corresponding STEM cross section) showing defects having a substantially vertical orientation, and wherein FIG. 7B is an exemplary intensity map (with line profiles and a corresponding STEM cross section) showing defects having a substantially non-vertical orientation.

DETAILED DESCRIPTION

The present disclosure embraces a method and system for optically detecting and mapping defects in a semiconductor film (e.g., III-V). The method and system create intensity maps of SHG light that results from probing a top surface of a semiconductor film. Hot-spots in the intensity maps can be used to characterize defects in the III-V semiconductor film. The characterization includes, but is not limited to, defect location, defect density, and defect orientation.

Figure 1:
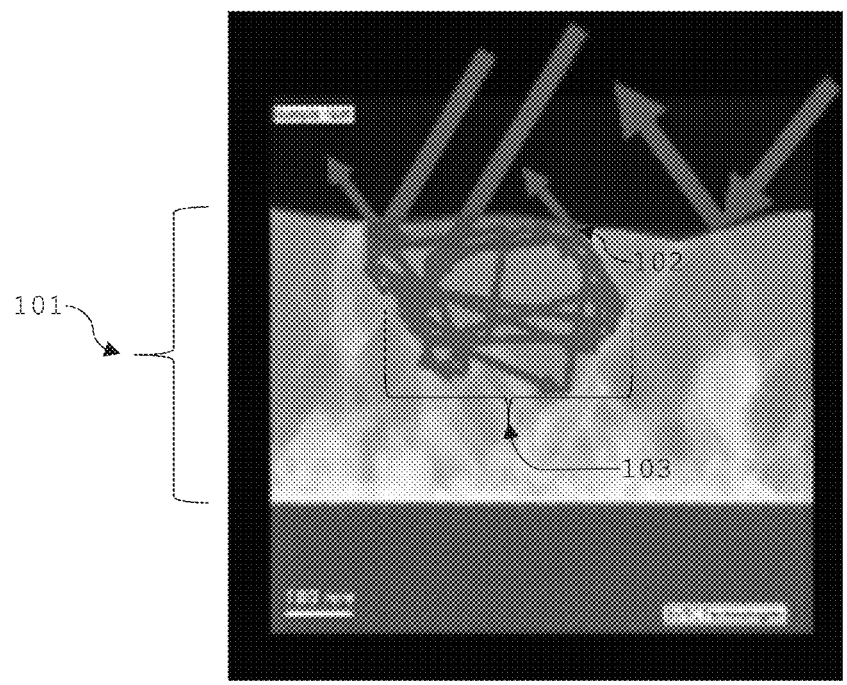
FIG. 1 graphically depicts the localization of light in a semiconductor film by defects according to an exemplary embodiment of the present disclosure.

The correlation of hot-spots with defects arises from a SHG signature of localization of excitation light used in the probing created by the defects in the semiconductor film. FIG. 1 graphically depicts the localization of light in a semiconductor film by defects. FIG. 1 illustrates a cross-sectional scanning transmission electron microscopic (cross-STEM) image of a semiconductor film 101 with dislocation defects (shown in FIG. 1 as lines within the film). Exemplary rays of the excitation light are shown. As can be seen from FIG. 1, some be reflected from the surface, while other rays may penetrate the surface. The rays that penetrate the surface may experience additional reflections and scattering at the defects. Accordingly, the light may be localized in a subsurface region 103 based on the size and shape of defect structure. In other words, the defects may form cavities in which the light may experience multiple reflections and scattering.

The localization of the light below a surface region 102 may increase the number of photons in the surface region 102 due to constructive interference. Accordingly, the localized excitation light can create more SHG light in surface regions corresponding to sub-surface defects. These regions may thus appear as bright spots (hot-spots) on an intensity map of SHG light created by probing the surface of the semiconductor film.

While hot-spots are primarily detailed in embodiments of the present disclosure, it should be noted that the localization of the light below a surface region 102 may also decrease the number of photons in the surface region 102 due to destructive interference. Accordingly, the localized excitation light can create less SHG light in surface regions corresponding to sub-surface defects. These regions may thus appear as dark spots on an intensity map of SHG light created by probing the surface of the semiconductor film. As such, an analysis of the maps to detect and characterize defects may be based on bright spots and/or dark spots. In addition, a measurement of an intensity contrast as compared to a baseline (defect free) intensity may be used to detect and characterize defects. All of these embodiments are considered within the scope of the disclosure.

Figure 2:
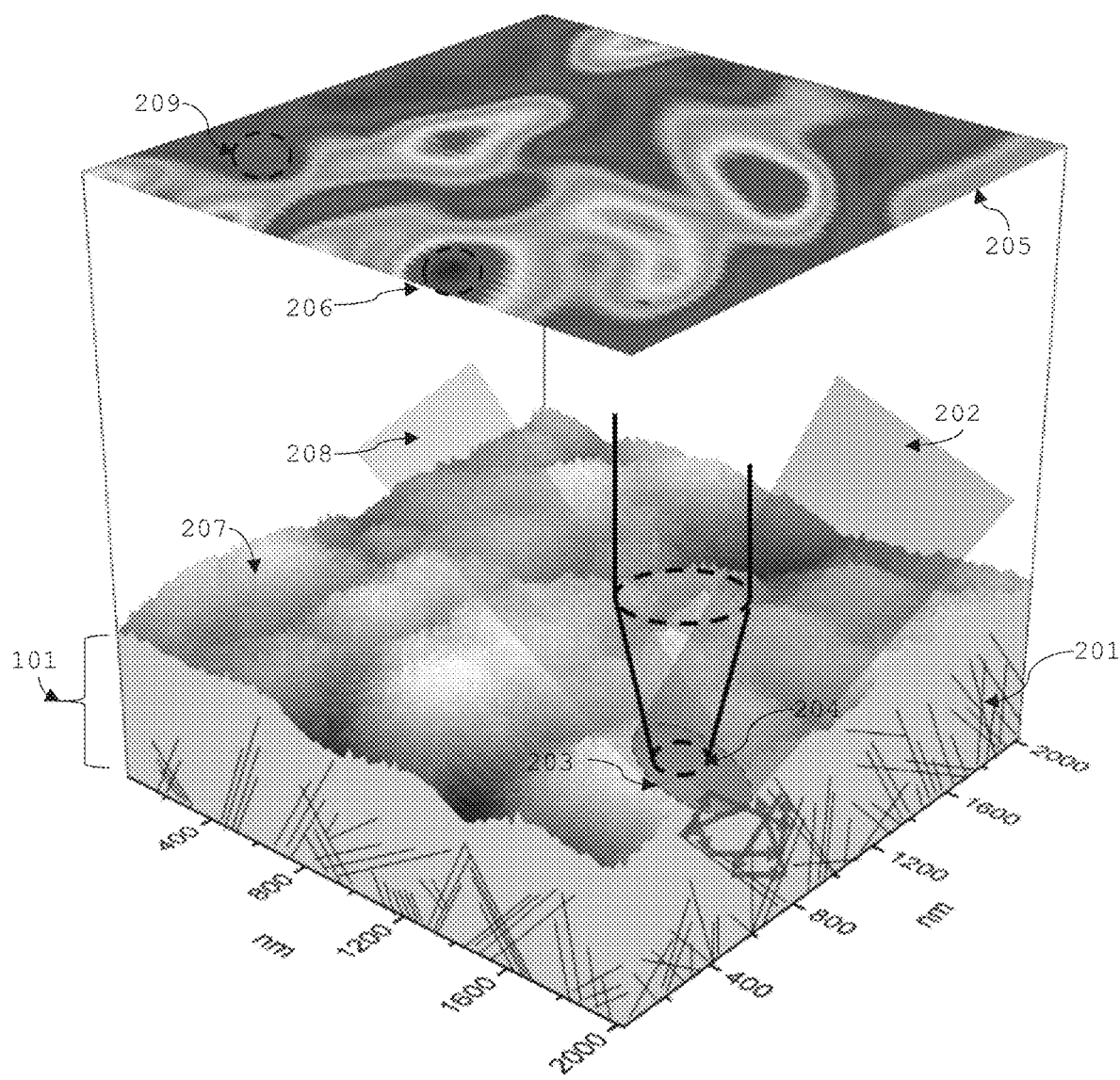
FIG. 2 graphically depicts the optical detection and mapping of defects in a semiconductor film according to an exemplary embodiment of the present disclosure.

FIG. 2 graphically depicts the optical detection and mapping of defects in a semiconductor film 101. As shown, the semiconductor film with defects 201 may be probed by illuminating an area 203 on a top surface 207 of the semiconductor film 101 with a beam of excitation light 202 from a laser. The area illuminated may be approximately 5 microns ($\mu$m) on an axis. The light may be collected via an aperture 204 of a fiber probe (i.e., probe) of a near-field microscope. The reflected/scattered light 208 collected via the probe may be filtered to retain only SHG light created from the non-linear response of the semiconductor film to the excitation light 202. The probing may be repeated to collect SHG light intensities for different areas as part of a scan of the semiconductor film. The results of the scan (i.e., the SHG intensities) may be used to create an intensity map that spatially corresponds to semiconductor film and with amplitudes corresponding to the intensity of SHG light measured at various locations on the semiconductor film. Due to the localizing effect of the defects, hot-spots 206 (or dark spots 209) in the intensity map 205 may be observed.

Figure 3:
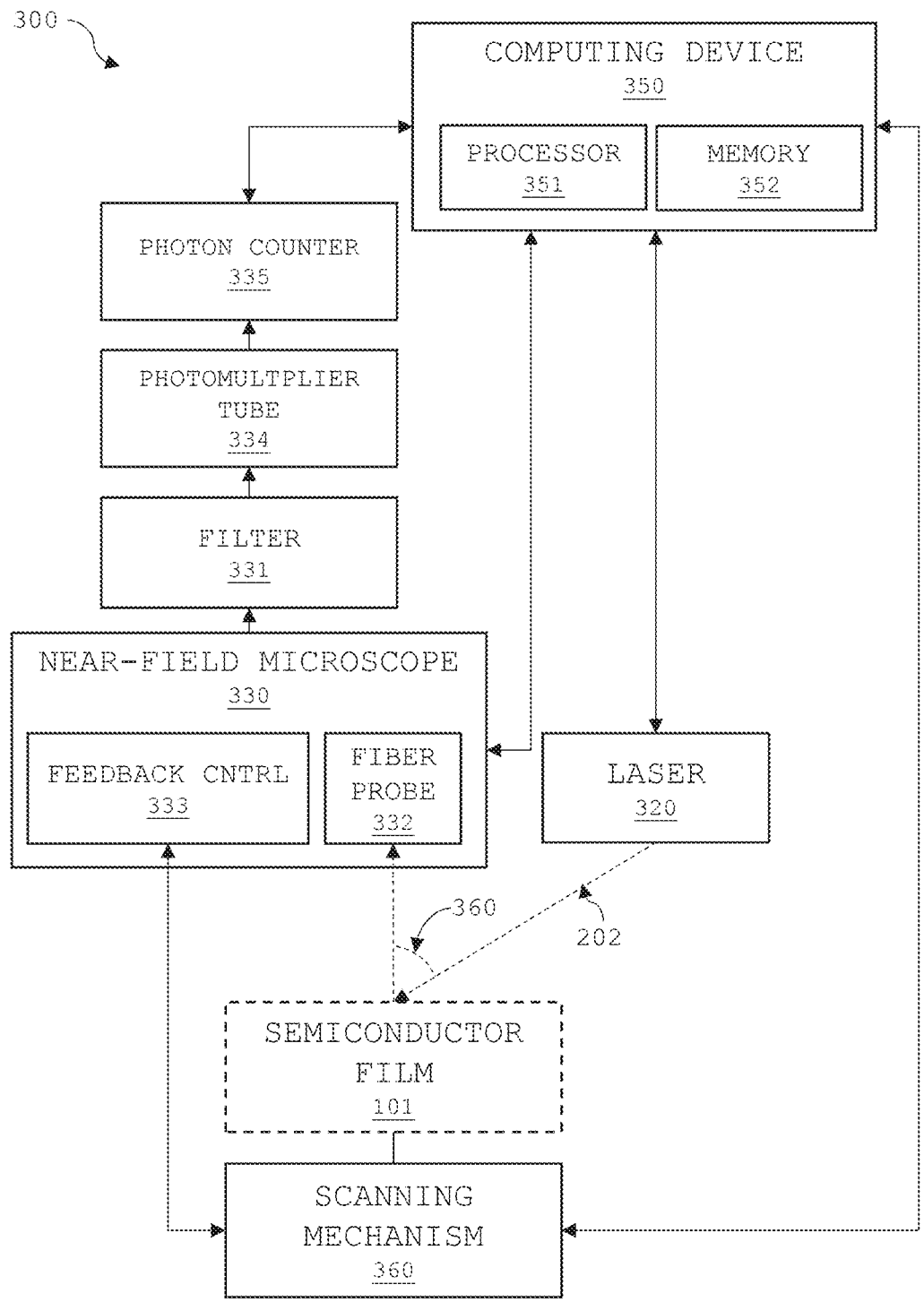
FIG. 3 is a block diagram of a system for optically detecting and mapping defects in a semiconductor film according to an exemplary embodiment of the present disclosure.

FIG. 3 is a block diagram of a system 300 for optically detecting and mapping defects 201 in a semiconductor film 101 according to an exemplary embodiment of the present disclosure.

The semiconductor film 101 is typically a group III-V film such as GaAs, $In_{30}Ga_{70}As$, or InP that is epitaxially deposited on a substrate, such as Si or Ge. The mismatch between the semiconductor film and the substrate (e.g., 4.5% mismatch for GaAs and Si) can lead to dislocation defects (e.g., threading defects) that create reflecting structures (e.g., cavities) within the film having a size in the range of 10-1000 nm. The semiconductor film's top surface 207 may have a surface roughness in the range of 1-100 nm from peak to valley, and the semiconductor film may be approximately 500-1000 nm thick.

The system 300 includes a laser 320 that is controlled by a computing device 350 to project a beam of excitation light 202. The excitation light should penetrate the semiconductor film in order interact with the defects 201 and elicit a nonlinear response from the semiconductor. If, however, the defect areas are beyond the penetration depth of the excitation laser detection could fail. Accordingly, nonlinear response, defect size/configuration, and the semiconductor's absorption are factors in determining the wavelength of the excitation light. Typically, the wavelength is selected from range of 700-900 nanometers. The laser is pulsed to elicit the nonlinear response of the semiconductor film. An exemplary laser may generate excitation light with a pulse width of ~150 femto-second (fs) and a wavelength of 780 nm or 840 nm.

The excitation light 202 elicits a non-linear response from the semiconductor film due to the film's non-centrosymmetric crystal structure. The non-linear response of the film manifests light in a second harmonic format in response to the laser excitation light. Accordingly, 780 nm excitation light creates SHG light at 390 nm.

A near-field scanning optical microscope (i.e., near-field microscope) 330 is used to collect light from the semiconductor film. The near-field microscope is operated in collection mode to collect light scattered and reflected from the surface and subsurface of the film. The collected light is dominated by the linear response from the material with only a few photons of SHG light generated for every several million photons of excitation light. Thus, filtering the light from the film's linear response (i.e., the linear light) to retain only the SHG light is necessary prevent information regarding the defects from being obscured. Filtering can be achieved several ways.

Filtering can be achieved partially using a fiber probe 332 of the near-field microscope. The fiber probe 332 is positioned above the top-surface 207 of the semiconductor film 101 to collect light. Typically, the optical axis of fiber probe is aligned normal to the top-surface of the semiconductor film so that the optical axis of the near-filed field microscope is at an angle 360 with the beam of excitation light 202 projected by the laser 320. The angle is typically in the range of 25-65 degrees (e.g., 45 degrees). The aperture of the fiber probe is typically positioned less than 100 nm (e.g., 20 nm) above the top surface of the semiconductor film to insure high resolution. The position above the semiconductor film may be controlled during scanning non-planar or rough top-surface using a feedback loop system. For example, the fiber probe's position may be maintained at a height in the range of 10-50 nm by a feedback controller 333 that monitors a vibration amplitude corresponding to the fiber probe 332. For high resolution, the aperture diameter is typically less than 100 nm. The choice of aperture diameter may also be a balance of optical resolution and throughput. For example, the diameter of the aperture 204 may be 50 nm. The fiber probe 332 is typically uncoated to avoid manipulating a local field due to a plasmonic effect. Accordingly, the near-field microscope collects only the strong propagating light and not the weak evanescent light. In addition, a cut-off wavelength associated with fiber probe filters unwanted light.

In some embodiments the system 300 may be used to also collect topography information at the same time that the maps are created. In these embodiments, topography information may be collected with the fiber probe 332 at a distance of about 20 nm above the film.

Filtering can also be achieved using a filter 331 after the near-field microscope 330. Absorptive, reflective, and/or interference optical filters may be used to filter the light collected by the fiber probe 332 in order to retain only SHG light (i.e., remove excitation light). The filter may comprise a plurality of filters and may be long-pass, short-pass, and/or bandpass optical filters.

Filtering can also be achieved using a sensitivity profile of a photomultiplier tube (PMT) 334. The photomultiplier tube 334 is used to detect photons of the collected and filtered light. The photomultiplier tube has a sensitivity profile that varies with wavelength to provide an additional measure of filtering. The photomultiplier receives filtered light and returns a value via a photon counter 335, wherein the value corresponds to the intensity of the SHG light.

The system 300 also includes a computing device that is communicatively coupled to the laser 330, the near-field microscope 330, and a scanning mechanism. The computing device includes a memory 352 that can be used to store software instructions and/or data. The computing device also includes a processor that is configured by the software to control the illumination (e.g., laser parameters, timing, etc.) and detection (e.g., exposures, timing, etc.) of SHG light intensity during a scan of the semiconductor film 101. The processor 351 can also be configured to create an intensity map 205 of the semiconductor film 101 from SHG intensities collected during the scan, wherein hot-spots 206 in the intensity map correspond to defects 201 in the semiconductor film 101.

During repeating probing (i.e., scanning) a scanning mechanism 360 is controlled by the processor and feedback controller 333 to position and reposition the semiconductor film. A vertical position of the film may be controlled to maintain the semiconductor at a range below the fiber probe 332, while horizontal positions of the film may be controlled to move different regions of the film into the field of view of the fiber probe 332. For example, a scan of the top surface of the semiconductor film may consist of a raster scan of a 2 μm×2 μm area using a 20 nm step size to obtain a 100×100 pixel map. A typical scanning mechanism 360 may consists of a piezoelectric stage controlled by the computing device. In other possible embodiments, however, the scanning mechanism may be manually tuned between steps of a scan. In other possible embodiments, the scanning mechanism may be omitted, and the near-field microscope and laser may be repositioned over a stationary semiconductor film during a scan.

Figure 4:
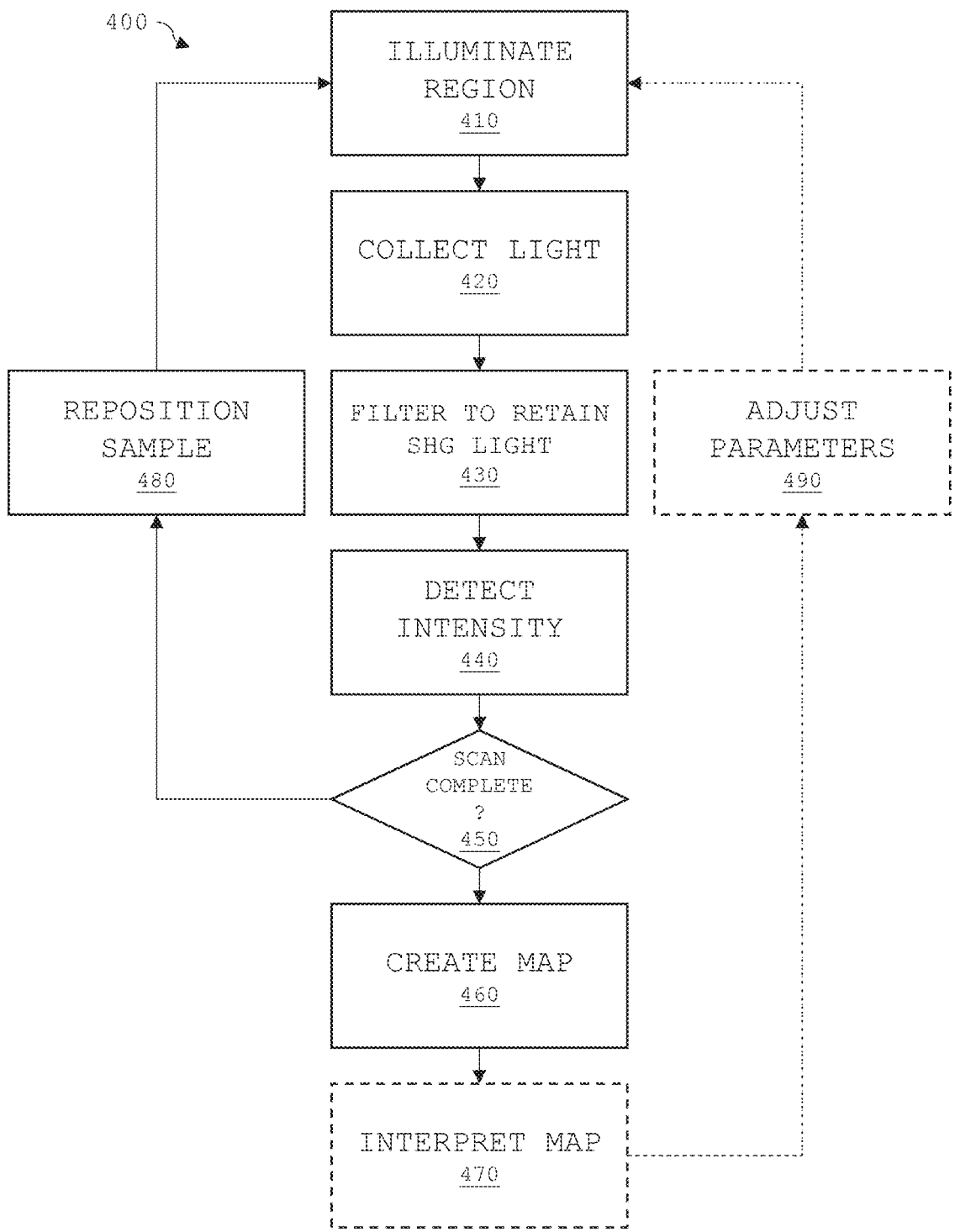
FIG. 4 is a flow diagram of a method for optically detecting and mapping defects in a semiconductor film according to an exemplary embodiment of the present disclosure.

FIG. 4 is a flow diagram of a method 400 for optically detecting and mapping defects in a semiconductor film according to an exemplary embodiment of the present disclosure. In the exemplary method, a region on a top surface of a semiconductor film is probed to detect an intensity of SHG light from the region. The probing comprises illuminating 410 the region with excitation light. Light from the region is then collected 420 and filtered 430 to retain only the SHG light from the region. The intensity of this SHG light is detected 440. If the scan is not complete 450 then the sample is repositioned 480 so that a new region may be probed. If, however, the scan is complete, then an intensity map of the SHG light collected from the surface may be created 460. Additionally, the method may include interpreting 470 the map (e.g., manually or automatically) to make a determination. The interpretation typically includes a characterization of bright spots (i.e., hot-spots) in the intensity map. In addition, as mentioned previously, dark spots may also provide additional information.

The interpretation of the map may include an identification of a defect location in the semiconductor film using the relative position of a hot spot in the intensity map. The interpretation may also include the determination of a defect density based on the size of a hot-spot in the intensity map. The interpretation may also include the determination of a defect orientation with respect to the top surface based on a shape of a hot-spot or a pattern of hot-spots. The interpretation may be performed manually (e.g., human inspection) or automated (e.g., computer assisted). In some embodiments, the results of interpretations may include a pass/fail criterion for the semiconductor film. For example, defects may be detected as part of a fabrication process.

The method 400 may also include gathering multiple maps from a plurality of scans to make a determination. In this embodiment, parameters may be adjusted 490 between scans. The parameters may include parameters associated with the excitation/collection (e.g., wavelength, energy, intensity, etc.) or the mechanical setup (e.g., angle of illumination, height of fiber probe, etc.).

Figure 5A:
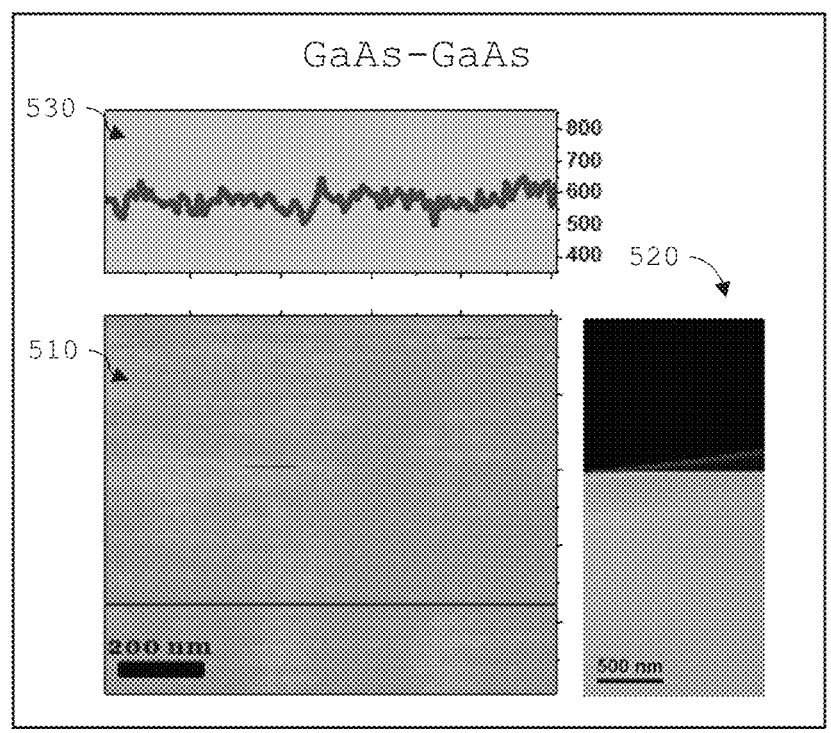
FIG. 5A depicts exemplary results of mapping defects in a GaAs film on a GaAs substrate (with no defects) including a line profile and reference cross-sectional STEM image for comparison.
Figure 5B:
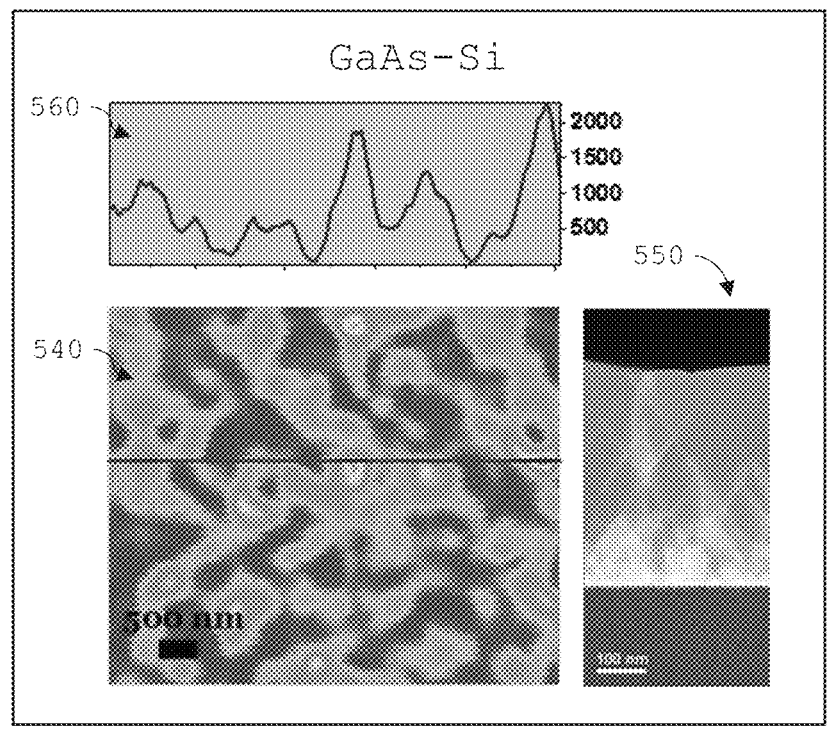
FIG. 5B depicts exemplary results of mapping defects in a GaAs film on a Si substrate (with defects) including a line profile and a reference cross-sectional STEM image for comparison.

FIGS. 5A and 5B depicts exemplary results of mapping defects in semiconductor films on substrates. FIG. 5A shows the results of a GaAs semiconductor film on a matched GaAs substrate. Because the film is matched to the substrate, no defects exist. The intensity map 510 of the semiconductor film contains no hot-spots and a line profile 530 of the intensity map shows little variation. This is in good agreement with a cross-STEM image 520 of the semiconductor film, which shows no visible dislocation defects.

The results of FIG. 5A can be compared with FIG. 5B, which shows the results of a GaAs semiconductor film on a mismatched Si substrate. Because the film is mismatched to the substrate, defects exist. The intensity map 540 of the semiconductor film contains hot-spots and a line profile 560 of the intensity map shows much variation. This is in good agreement with a cross-STEM image 550 of the semiconductor film, which shows visible defects.

Figure 6:
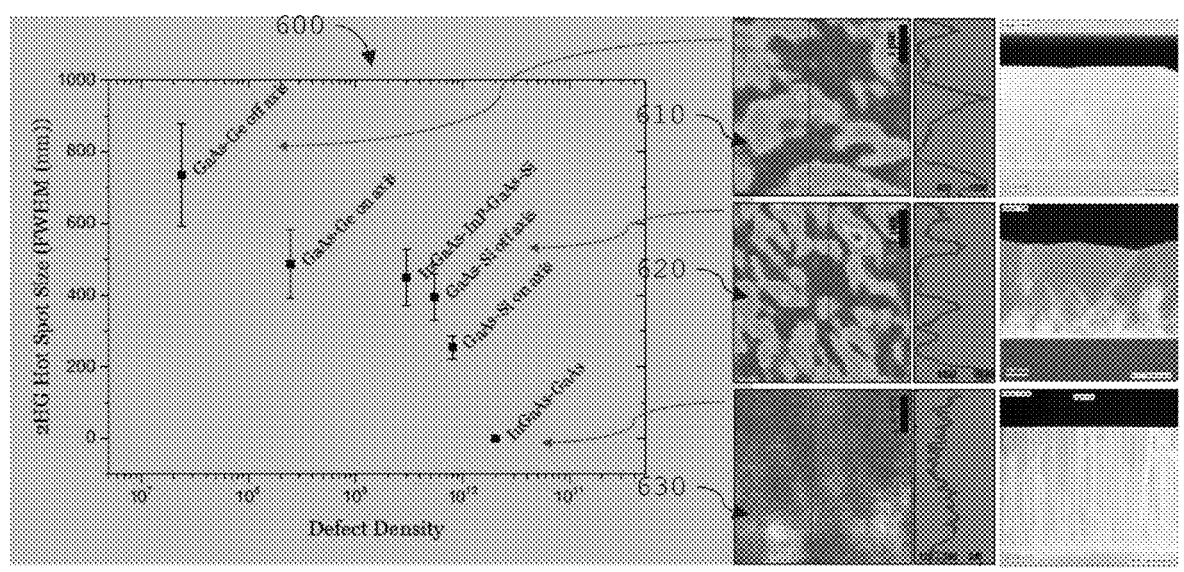
FIG. 6 is plot illustrating the relationship between defect density and hot-spot size according to an embodiment of the present disclosure.

A plot 600 illustrating the relationship between dislocation defect density and hot-spot size for exemplary semiconductor films is shown in FIG. 6. As can be observed in the plot, the size of a hot-spot decreases as the defect density increases. Intensity maps, line profiles, and cross STEM images of three different semiconductor film and substrate combinations from the plot 610,620,630 further illustrate this dependency.

Figure 7A:
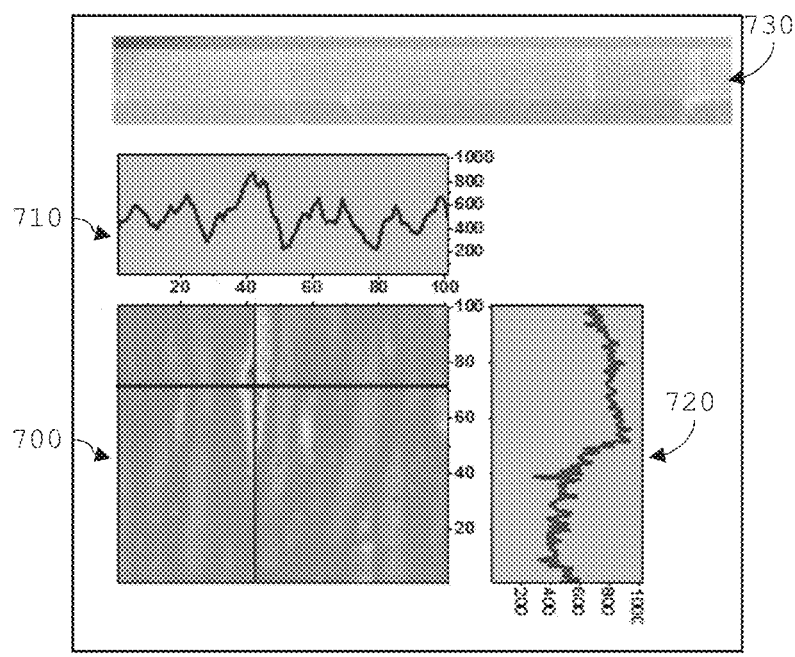
Figure 7B:
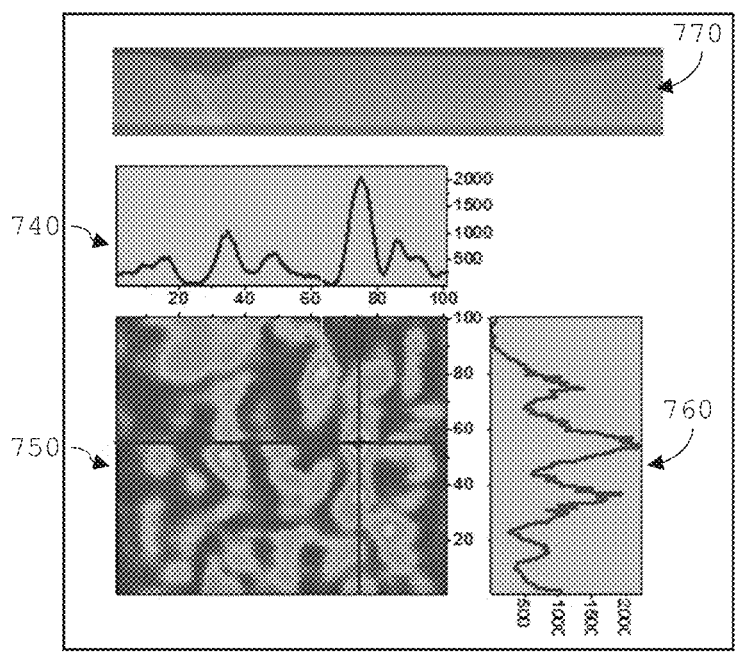

FIGS. 7A and 7B graphically illustrate the relationship between hot-spot shape/pattern and defect orientation. FIG. 7A includes an exemplary intensity map 700 of a semiconductor film having defects in a substantially vertical orientation with respect to the top surface of the semiconductor film. As can be observed, a hot spot in this intensity map has an elongated (i.e., streak) shape. A horizontal line profile 710, a vertical line profile 720, and a cross STEM image 730 support the dependency of hot-spot shape on defect orientation. FIG. 7B includes an exemplary intensity map 750 of a semiconductor film having defects in a substantially non-vertical orientation. As can be observed, a hot spot in this intensity map 750 has a round shape. A horizontal line profile 740, a vertical line profile 760, and a cross STEM image 770 support the dependency of hot-spot shape on defect orientation. The maps in FIGS. 7A and 7B are of InGaAs—InP—GaAs—Si layers grown under different conditions and doping.

Those skilled in the art will appreciate that various adaptations and modifications of the preferred and alternative embodiments described above can be configured without departing from the scope and spirit of the disclosure. Therefore, it is to be understood that, within the scope of the appended claims, the disclosure may be practiced other than as specifically described herein.

The invention claimed is:

1. A method for optically detecting and mapping defects in a semiconductor film, the method comprising:
   probing a region of a top surface of a semiconductor film to detect an intensity of second harmonic generated (SHG) light from the region, wherein the probing comprises collecting light from the region using a near-field microscope;
   scanning the semiconductor film by repeating the probing for other regions of the semiconductor film; and
   creating an intensity map of the semiconductor film based on the intensities resulting from the scan, wherein pixel intensities in the intensity map correspond to defects in the semiconductor film,
   wherein the near-field microscope collects propagating light and not evanescent light.

2. The method according to claim 1, wherein hot-spots in the intensity map correspond to defects in the semiconductor film.

3. The method according to claim 2, wherein the probing further comprises filtering the collected light to retain only the SHG light.

4. The method according to claim 3, wherein the filtering comprises blocking wavelengths other than wavelengths of the SHG light using a cutoff wavelength of a fiber probe of the near-field microscope.

5. The method according to claim 3, wherein the filtering comprises blocking wavelengths other than wavelengths of the SHG light using a bandpass filter.

6. The method according to claim 3, wherein the filtering comprises blocking wavelengths other than wavelengths of the SHG light using a sensitivity profile of a photomultiplier tube.

7. The method according to claim 2, wherein a size of a hot-spot corresponds to a defect density or wherein a shape/pattern of hot spots corresponds to a defect orientation with respect to the top surface.

8. The method according to claim 1, wherein the defect is a dislocation defect caused by a mismatch at an interface between the semiconductor film and a substrate.

9. The method according to claim 1, wherein the SHG light is generated by a beam of excitation light that illuminates the region at an angle with an optical axis of a fiber probe of the near-field microscope.

10. The method according to claim 9, wherein the angle is in the range of 25-65 degrees.

11. The method according to claim 9, wherein a wavelength of the excitation light is selected to provide penetration into the semiconductor and reaching a cavity formed by the defects.

12. The method according to claim 11, wherein the wavelength is in the range of 700-900 nanometers.

13. The method according to claim 11, wherein the excitation light is pulsed.

14. The method according to claim 9, wherein the region illuminated has an axis diameter in the range of 1-7 microns.

15. The method according to claim 1, wherein a fiber probe of the near-field microscope is positioned less than 100 nanometers (nm) above the top surface of the semiconductor film.

16. The method according to claim 15, wherein an input aperture of the fiber probe is less than 100 nanometers in diameter.

17. The method according to claim 15, wherein the fiber probe is uncoated.

18. The method according to claim 15, wherein the fiber probe's position above the top surface is controlled using a feedback controller.

19. The method according to claim 1, wherein the semiconductor film is a III-V semiconductor.

20. The method according to claim 1, wherein the near-field microscope is operated in collection mode.

21. The method according to claim 1, wherein the semiconductor film is moved during the scanning.

22. A system for optically detecting and mapping defects in a semiconductor film, the system comprising:

a laser that illuminates a region of a top surface of the semiconductor film with excitation light;
a near-field microscope that collects light from the region and detects an intensity of second harmonic generated (SHG) light;
a scanning mechanism mechanically that moves the semiconductor film relative the near-field microscope; and
a computing device communicatively coupled to the laser, the near-field microscope, and the scanning mechanism, wherein the computing device comprises a processor that is configured by software instructions to:
control the laser to illuminate the region with excitation light and the near-field microscope to detect the intensity of the SHG light from the region,
reposition the sample so that the laser and near-field microscope are positioned over a new region, and
repeat the controlling and repositioning to create an intensity map of the semiconductor film based on the SHG intensities obtained from each region, wherein hot-spots in the intensity map correspond to defects in the semiconductor film.

23. The system according to claim 22, wherein the detecting an intensity of SHG light comprises filtering the collected light to retain only the SHG light.

24. The system according to claim 22, wherein a size of a hot-spot corresponds to a defect density or wherein a shape/pattern of hot-spots corresponds to a defect orientation with respect to the top surface.

25. The system according to claim 22, wherein the defect is a dislocation defect caused by a mismatch at an interface between the semiconductor film and a substrate.

26. The system according to claim 22, wherein the near-field microscope collects propagating light and not evanescent light.

27. The system according to claim 22, wherein the SHG light is generated by a beam of excitation light that illuminates the region at an angle with an optical axis of a fiber probe of the near-field microscope.

28. The system according to claim 22, wherein a fiber probe of the near-field microscope is positioned less than 100 nanometers (nm) above the top surface of the semiconductor film.

29. The system according to claim 22, wherein the semiconductor film is a III-V semiconductor.

30. The system according to claim 22, wherein the near-field microscope is operated in collection mode.

31. The system according to claim 22, wherein the semiconductor film is moved during the scanning.

32. A method for optically detecting and mapping defects in a semiconductor film, the method comprising:
probing a region of a top surface of a semiconductor film to detect an intensity of second harmonic generated (SHG) light from the region, wherein the probing comprises collecting light from the region using a near-field microscope;
scanning the semiconductor film by repeating the probing for other regions of the semiconductor film; and
creating an intensity map of the semiconductor film based on the intensities resulting from the scan, wherein pixel intensities in the intensity map correspond to defects in the semiconductor film, and wherein hot-spots in the intensity map correspond to defects in the semiconductor film,
wherein the probing further comprises filtering the collected light to retain only the SHG light and the filtering comprises blocking wavelengths other than wavelengths of the SHG light using a sensitivity profile of a photomultiplier tube.

33. A method for optically detecting and mapping defects in a semiconductor film, the method comprising:
probing a region of a top surface of a semiconductor film to detect an intensity of second harmonic generated (SHG) light from the region, wherein the probing comprises collecting light from the region using a near-field microscope;
scanning the semiconductor film by repeating the probing for other regions of the semiconductor film; and
creating an intensity map of the semiconductor film based on the intensities resulting from the scan, wherein pixel intensities in the intensity map correspond to defects in the semiconductor film,
wherein the SHG light is generated by a beam of excitation light that illuminates the region at an angle with an optical axis of a fiber probe of the near-field microscope and the region illuminated has an axis diameter in the range of 1-7 microns.

34. A method for optically detecting and mapping defects in a semiconductor film, the method comprising:
probing a region of a top surface of a semiconductor film to detect an intensity of second harmonic generated (SHG) light from the region, wherein the probing comprises collecting light from the region using a near-field microscope;
scanning the semiconductor film by repeating the probing for other regions of the semiconductor film; and
creating an intensity map of the semiconductor film based on the intensities resulting from the scan, wherein pixel intensities in the intensity map correspond to defects in the semiconductor film,
wherein a fiber probe of the near-field microscope is positioned less than 100 nanometers (nm) above the top surface of the semiconductor film.

* * * * *